April 14, 1925. 1,533,248

E. HARWIX

PRISMATIC TELESCOPE

Filed July 22, 1921

Witnesses:
Frieda E. Wolff
Harry E. Vandersyde.

Inventor:
Ewald Harwix
by Christy and Christy
Attorneys

Patented Apr. 14, 1925.

1,533,248

UNITED STATES PATENT OFFICE.

EWALD HARWIX, OF BERLIN-STEGLITZ, GERMANY.

PRISMATIC TELESCOPE.

Application filed July 22, 1921. Serial No. 486,850.

(GRANTED UNDER THE PROVISIONS OF THE ACT OF MARCH 3, 1921, 41 STAT. L., 1313.)

*To all whom it may concern:*

Be it known that I, EWALD HARWIX, a citizen of the German Republic, residing at Berlin-Steglitz, Germany, have invented certain new and useful Improvements in Prismatic Telescopes (for which I have filed application in Germany, April 21, 1920; in Austria, April 19, 1921; in Switzerland, April 19, 1921; in France, April 20, 1921; and in Great Britain, April 26, 1921); and I do hereby declare the following to be a full, clear, and exact description of the invention, such as will enable others skilled in the art to which it appertains to make and use the same.

My invention relates to improvements in prismatic telescopes, and the object of the improvements is to provide a telescope which is simple in construction, and which as compared to its power has small dimensions. With this object in view my invention consists in forming the sections of the body or frame of the telescope with cavities corresponding to the perpendicular side faces and bases of the prisms, and embedding the prisms in said cavities. By thus holding the prisms with four faces within the cavities other fastening means may be dispensed with.

When thus constructing the telescope it is not possible to adjust the prisms within the body. However, I have found that the cavities can easily be made with sufficient accuracy to insure the proper position of the prisms in telescopes of comparatively small power, slight inaccuracies being compensated by adjusting the object glass or eye pieces. In the preferred form the body of the telescope is made from suitable material such as metal, cellon (cellon is the trade name of acetyl cellulose prepared in such way that it becomes plastic when heated), or the like by casting or pressing, whereby bodies of accurate form and affording correct positions for members of the optical system are easily produced. Preferably, the body enclosing a pair of co-operating prisms is made in two sections each enclosing one of the prisms, and the sections are rigidly connected with each other by screws, soldering, cemeting or the like, according to the material from which the sections are made. The sectional bodies are thus directly connected with each other. In a modification of the invention the sectional bodies are secured to a frame carrying the eye pieces and object glasses. In case of binoculars the bodies of each side are formed with corresponding eyes affording hinge connections. Preferably the tubes carrying the eye piece and the object glass are directly mounted in cylindrical holes formed in the bodies.

For the purpose of explaining the invention two examples embodying the same have been shown in the accompanying drawing, in which,—

Figure 1:
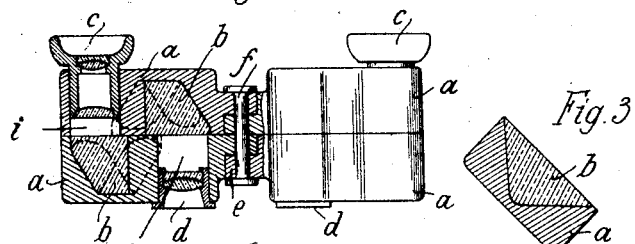
Fig. 1 is a front view of a prismatic binocular partly in section.
Figure 3:
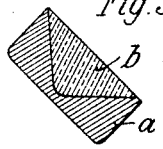
Fig. 3 is a section taken on the line A—B of Fig. 2.
Figure 2:
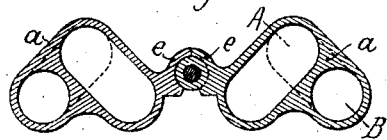
Fig. 2 is a horizontal section of Fig. 1.

In the example shown in Figs. 1 to 3, the body of the binocular consists of four sectional bodies *a* each formed with a prismatic cavity receiving a prism *b* and having cavity walls corresponding to the perpendicular faces and bases of the prisms. As appears more particularly from Fig. 3 the prisms are embedded with their perpendicular faces and bases within the said cavities, while their hypotenuses are at the open sides thereof. The prisms of the upper and lower sectional bodies are, when viewed in plan, as shown in Fig. 2, disposed at right angles one to the other. The upper and lower bodies are formed with cylindrical bores *i* and *k* receiving respectively the tube *c* for eye piece and the tube *d* for the object glass. After embedding the prisms within their cavities the sectional bodies are placed one above the other and connected in a suitable way according to the character of the material from which they are made, for example by soldering, cementing, by screws, or the like. In case of a binocular the sectional bodies *a* are formed with eyes *e* providing for a hinge connection of pairs of bodies, and the two binocular parts are united by a bolt *f*.

Figure 4:
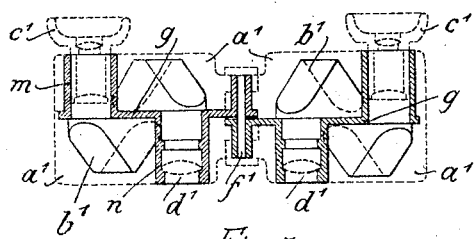
Fig. 4 is a sectional view showing a binocular comprising metallic frames and sectional bodies confining the prisms, said bodies being shown in dotted lines.
Figure 5:
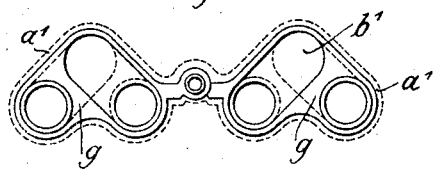
Fig. 5 is a plan view of Fig. 4 with the eye-piece tubes removed.

In the modification shown in Figs. 4 and 5 the body of the binocular comprises two frames $g$, hinged together at $f^1$. Each frame is formed with an upper and lower tubular portion $m$ and $n$ receiving respectively the eye piece $c^1$ and the object glass $d^1$. The sectional bodies $a^1$ confining the prisms $b^1$ are secured respectively to the upper and lower sides of the frames and they are formed with cylindrical bores embracing the tubular portions $m$ and $n$ and the eye pieces $c^1$ and object glasses $d^1$ confined therein. This construction is particularly designed for use in connection with sectional bodies made from a material which has not by itself sufficient rigidity.

From the foregoing description it will be understood that the improved telescope consists of few parts, and that it can be manufactured at low cost. An important feature resides in the fact that the dimensions of the telescope are small, which is particularly desirable in case of opera binoculars.

While in describing the invention reference has been made to particular examples embodying the same, it should be understood that the invention is not limited to the constructions shown in the drawing, and that various changes may be made in the general arrangement of the apparatus and in the construction of its parts within the gist of the invention.

I claim:

1. In a prismatic telescope two complementary integral, self-sustaining units each consisting of a sustaining body and a sustained prism, the prism being embedded in the body, the assembled units being set opposite one another and each unit being disposed wholly on the remote side of the plane in which the exposed prism surface extends.

2. In a prismatic telescope the combination of two body sections, provided each with a prism-receiving cavity, right-angled in cross-section, and two prisms carried, each by one of said body sections, and secured in stationary position in the aforesaid cavity thereof, the body sections with the prisms in place being united and the prisms when assembly has been made being oppositely arranged and presenting each to the other a plain and unobstructed hypotenuse surface.

In testimony whereof I hereunto affix my signature in the presence of two witnesses.

EWALD HARWIX.

Witnesses:
FRANK REINHOLD,
GERTRUD SCHWARZ.